United States Patent [19]

Nagasawa

[11] Patent Number: 5,723,526
[45] Date of Patent: Mar. 3, 1998

[54] RESIN COMPOSITION AND MOLDED ARTICLE

[75] Inventor: Masashi Nagasawa, Chiba, Japan

[73] Assignee: Teijin Chemicals Ltd, Tokyo, Japan

[21] Appl. No.: 626,009

[22] Filed: Apr. 1, 1996

Related U.S. Application Data

[63] Continuation-in-part of Ser. No. 301,630, Sep. 7, 1994, abandoned.

[30] Foreign Application Priority Data

Sep. 8, 1993 [JP] Japan ................... 5-223440

[51] Int. Cl.$^6$ .............. C08J 5/10; C08K 3/34; C08L 69/00
[52] U.S. Cl. .......... 524/451; 524/140; 524/127; 524/141; 524/143; 525/101; 525/72; 525/104
[58] Field of Search ............... 524/140, 449, 524/451, 127, 141, 143; 525/67, 101, 72, 146, 100, 104, 903

[56] References Cited

U.S. PATENT DOCUMENTS 5,061,745 10/1991 Wittman et al. ............... 524/139
5,250,615 10/1993 Yamamoto et al. ............... 525/63

FOREIGN PATENT DOCUMENTS

| | | |
|---|---|---|
| 0135904 | 4/1985 | European Pat. Off. . |
| 0204232 | 12/1986 | European Pat. Off. . |
| 0307963 | 3/1989 | European Pat. Off. . |
| 0345522 | 12/1989 | European Pat. Off. . |
| 0430134 | 6/1991 | European Pat. Off. . |

*Primary Examiner*—George F. Lesmes
*Assistant Examiner*—U. K. Rajguru

[57] ABSTRACT

A resin composition consisting essentially of (a) an aromatic polycarbonate resin, (b) a thermoplastic graft copolymer obtained by grafting a diene rubber component with a vinyl cyanide compound and an aromatic vinyl compound, (c) a phosphoric acid ester, (d) a polytetrafluoroethylene, (e) a talc, and (f) a composite rubber having a network structure in which a polyorganosiloxane rubber component and a polyalkyl (meth)acrylate rubber component interpenetrate each other, each in a specified amount. This resin composition has excellent fluidity and allows easy mold-processing. The molded article made therefrom is excellent in flame retardancy, stiffness, heat-resistance, impact strength and appearance.

10 Claims, No Drawings

RESIN COMPOSITION AND MOLDED ARTICLE

CROSS-REFERENCE TO RELATED APPLICATION

This application is a continuation-in-part of application, U.S. Ser. No. 08/301,630 filed Sep. 7, 1994, now abandoned.

DETAILED DESCRIPTION OF THE INVENTION

1. Field of the Invention

The present invention relates to a flame-retardant resin composition and a molded article made therefrom. More particularly, the present invention relates to a flame-retardant resin composition superior in stiffness, fluidity and impact resistance, which comprises an aromatic polycarbonate resin and an ABS resin as the main components, a phosphoric acid ester and a polytetrafluoroethylene as the flame-retardant components, a specific inorganic filler and a specific composite rubber; and to a molded article made therefrom.

2. Prior Art

Molded articles made from aromatic polycarbonate resins are superior in mechanical properties and thermal properties and hence, are widely used in industrial fields. They, however, are inferior in processability and moldability. In order to alleviate this problem, a number of polymer blends between polycarbonate resin and other thermoplastic resin have been developed. Among them, polymer blends between polycarbonate resin and acrylonitrile-butadiene-styrene resin (ABS resin) are in wide use in automobiles, apparatuses for office automation, electronic and electric fields, etc. Meanwhile, there has recently been a strong demand for resin materials having flame retardancy, used in apparatuses for office automation, electric appliances for household use, etc. To meet this demand a number of proposals have been made as well for polymer blends between polycarbonate resin and ABS resin, in order to impart flame retardancy to the blends.

In imparting flame retardancy to an aromatic polycarbonate resin or a polymer blend thereof, it was a general practice to add a bromine-containing halogen-based flame retardant and an auxiliary flame retardant such as antimony trioxide in combination. This approach, however, generates harmful substance(s) when the resulting resin or polymer blend burns. Hence, use of a compound other than the bromine-containing halogen type compound has been studied actively. For example, combination use of a phosphoric acid ester and a polytetrafluoroethylene having a fibril formability has been studied.

The following proposals were made on, for example, aromatic polycarbonate resin compositions using a phosphoric acid ester as a flame retardant.

(1) Japanese Patent Application Kokai (Laid-Open) No. 55,145/1986 corresponding to U.S. Patent No.4,983, 658 and European Patent Publication No.174,493

This publication discloses a flame-retardant thermoplastic composition for molding, comprising the following components (a) to (f):

(a) an aromatic polycarbonate resin,
(b) an ABS resin,
(c) an acrylonitrile-styrene resin (AS resin),
(d) a halogen compound,
(e) a phosphoric acid ester, and
(f) a polytetrafluoroethylene.

(2) Japanese Patent Application Kokai (Laid-Open) No. 32,154/1990 corresponding to U.S. Pat. No. 5,061,745 and European Patent Publication No. 345,522

This publication describes a flame-retardant and highly impact-resistant polycarbonate composition for molding, comprising the following components (a) to (e):

(a) an aromatic polycarbonate resin,
(b) an ABS resin,
(c) an AS resin,
(d) a phosphoric acid ester, and
(e) a polytetrafluoroethylene.

According to the publication, the composition may further contains a stabilizer, a pigment, a flow aid, a filler, a reinforcing agent, a mold-release agent and/or an antistatic agent.

(3) Japanese Patent Application Kokai (Laid-Open) No. 69,557/1990 corresponding to U.S. Pat. No. 4,988,748 and European Patent Publication No.351,648

This publication discloses a flame-retardant thermoplastic polycarbonate composition for molding, comprising the following components (a) to (e):

(a) an aromatic polycarbonate resin,
(b) an AS resin,
(c) an ABS resin,
(d) a specific phosphoric acid ester, and
(e) a polytetrafluoroethylene.

(4) Japanese Patent Application Kokai (Laid-Open) No. 115,262/1990 corresponding to U.S. Pat. No. 5,204,394 and European Patent Publication No.363,608

This publication describes a flame-retardant composition comprising (a) an aromatic polycarbonate resin, (b) an ABS resin and (c) a phosphoric acid ester oligomer.

(5) Japanese Patent Application Kokai (Laid-Open) No. 297,352/1987 corresponding to U.S. Pat. No. 4,877,831 and European Patent Publication No.249,964;

Japanese Patent Application Kokai (Laid-Open) No. 17,912/1993 corresponding to U.S. Pat. No. 5,266,618 and European Patent Publication No. 520,186; and Japanese Patent Application Kokai (Laid-Open) No. 214, 205/1993 corresponding to European Patent Publication No. 537,014

These publications propose compositions having improved physical or chemical properties, obtained by adding a polyorganosiloxane to a polymer blend comprising aromatic polycarbonate resin and ABS resin.

An apparatus for office automation, electric appliances for household use, etc. have an increasing tendency to be lighter, thinner and smaller. This trend has necessitated higher stiffness for the materials used therein. In order to allow the materials to have higher stiffness, it is generally conducted to add a glass fiber, a carbon fiber or the like to the materials. Addition of such a fibrous reinforcing agent, however, has a defect that the molded articles made from the materials have inferior appearance, and hence, the improvement thereof has been sought.

The first object of the present invention is to provide a polymer blend which comprises an aromatic polycarbonate resin and an ABS resin and does not contain or contains a small amount of a halogen compound (e.g. a bromine or chlorine compound) as a flame retardant, and which has an excellent flame retardancy while retaining an excellent impact strength; and a molded article made therefrom.

The second object of the present invention is to provide the above polymer composition having improved fluidity and consequently, excellent moldability.

The third object of the present invention is to provide a molded article having excellent stiffness, made from the above polymer composition.

The other object of the present invention is to provide a molded article having good appearance and properties suitable for use as a housing for apparatuses for office automation, electric appliances for household use, etc.

According to the study by the present inventor, it has been found that the first two objects and advantages of the present invention can be achieved by a resin composition consisting essentially of:

(a) an aromatic polycarbonate resin, (b) a thermoplastic graft copolymer obtained by grafting a vinyl cyanide compound and an aromatic vinyl compound onto a diene rubber component, (c) a phosphoric acid ester, (d) a polytetrafluoroethylene, (e) a talc having an average particle diameter of 1.2 to 8.5 µm, and (f) a composite rubber having a network structure in which a polyorganosiloxane rubber component and a polyalkyl (meth)acrylate rubber component interpenetrate, said composite rubber having a gel content of 80% by weight or more when measured after extraction with toluene at 90° C. for 12 hours, in which composition (i) the proportions of the component (a), the component (b), the component (c) and the component (d) are 45 to 90% by weight, 10 to 40% by weight, 3 to 12% by weight and 0.1 to 2% by weight, respectively, based on the total weight (100% by weight) of the components (a), (b), (c) and (d) and (ii) the proportions of the component (e) and the component (f) are 5 to 25 parts by weight and 1 to 13 parts by weight, respectively, per the total weight (100 parts by weight) of the components (a), (b), (c) and (d).

Further, according to the inventor's study, it has been found that the last two objects of the present invention can be achieved by a molded article (e.g. a housing) obtained by melt-molding the above resin composition.

The resin composition and molded article made therefrom, of the present invention will be specifically explained hereinafter.

The aromatic polycarbonate resin [the component (a)] used in the resin composition of the present invention can be any aromatic polycarbonate resin as long as it is usable for the production of a molded article of a thermoplastic aromatic polycarbonate resin. The component (a) is produced generally by reacting a dihydric phenol with a carbonate precursor by a solution process or a melting process. Any aromatic polycarbonate resin obtained by these processes is usable as the component (a). Typical examples of the dihydric phenol used in production of the component (a) are 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3-methylphenyl)propane and bis(4-hydroxyphenyl)sulfone. Preferable dihydric phenols are bis (4-hydroxyphenyl)alkanes, particularly bisphenol A. The carbonate precursor includes carbonyl halides, diaryl carbonates, haloformates, etc., and is specifically phosgene, diphenyl carbonate, dihaloformates of dihydric phenol, mixtures thereof, etc. In producing the polycarbonate resin, the above-mentioned dihydric phenols can be used singly or in combination of two or more. In that case, it is possible to use an appropriate molecular weight modifier, an appropriate branching agent, an appropriate catalyst for acceleration of reaction, etc. according to an ordinary method. It is possible to use in combination two or more of the thus obtained aromatic polycarbonate resins.

The thermoplastic graft copolymer used as the component (b) in the present invention can be a resin which is ordinarily called "ABS resin". The diene rubber component constituting the thermoplastic graft copolymer is, for example, a rubber having a glass transition temperature of 10° C. or less, such as polybutadiene, polyisoprene, styrene-butadiene copolymer or the like. The proportion of the diene rubber component in the component (b) is preferably 10 to 95% by weight. The aromatic vinyl compound to be grafted onto the diene rubber component includes, for example, styrene, α-methylstyrene and nucleus-substituted styrenes. The proportion of the aromatic vinyl compound as the graft component in the component (b) is preferably 50 to 90% by weight. The vinyl cyanide compound to be grafted onto the diene rubber component includes, for example, acrylonitrile and methacrylonitrile. Maleic anhydride or N-substituted maleimide may be used together with the vinyl cyanide compound. The proportion of the vinyl cyanide compound as the graft component in the component (b) is preferably 50 to 5% by weight.

The thermoplastic graft copolymer [the component (b)] can be produced by any of bulk polymerization, suspension polymerization and emulsion polymerization. The polymerization can be conducted in one stage or multi-stages. The components (b) may be used singly or in combination of two or more.

The phosphoric acid ester used as the component (c) in the present invention is used as a flame retardant. The component (c) can therefore be any phosphoric acid ester or a phosphoric acid ester oligomer, both ordinarily used as a flame retardant in various polymer molded articles. That is, the component (c) can be a phosphoric acid ester obtained by reacting an alcohol or a phenol compound with phosphorus oxychloride or phosphorus pentachloride. In this case, when a dihydric phenol compound (e.g. resorcin, hydroquinone or diphenol) is used as the phenol compound, together with a monohydric phenol, a phosphoric acid ester oligomer is obtained. The component (c) is preferably a phosphoric acid triester obtained by reacting an aromatic monohydroxy compound with a phosphorus compound. Specific examples of the phosphoric acid triester are triphenyl phosphate (TPP), tricresyl phosphate (TCP), a mixture of TPP and TCP, trixylenyl phosphate, cresyl diphenyl phosphate and octyl diphenyl phosphate. Triphenyl phosphate is particularly preferable.

By using the component (c) in a given amount, a molded article of excellent flame retardancy can be obtained. It is possible to use, together with the component (c), a small amount of other flame retardant such as brominated diphenyl ether, brominated bisphenol A, a polymer derived therefrom or the like.

In the present invention, a polytetrafluoroethylene is used as the component (d). A polytetrafluoroethylene having a fibril formability is suitable and it falls in Type 3 of the ASTM specification. A polytetrafluoroethylene having no fibril formability is unsuitable as the component (d). Specific examples of the polytetrafluoroethylene suitable as the component (d) are Teflon 6J (a product of Mitsui-DuPont Fluorochemical Co., Ltd. and Polyflon F-201L (a product of Daikin Industries, Ltd.), which are both commercially available easily.

The talc used as the component (e) in the present invention is essential to achieve the objects of the present invention. The objects of the present invention cannot be achieved with other filler, for example, a mica or a glass fiber. The talc as the component (e) has an average particle diameter of 1.2 to 3.5 µm, preferably 1.8 to 3.0 µm.

When the average particle diameter of the talc is smaller than 1.2 μm, undesirably, the resultant talc gives an article having a reduced rigidity, while when it exceeds 3.5 μm, such talc provides an article having a poor appearance and a low impact resistance, which is also undesirable.

Further, it is advantageous that the talc has an aspect ratio (longer diameter/thickness) of at least 5, preferably in a range of 10 to 20.

The composite rubber used as the component (f) in the present invention has a structure in which the crosslinked networks of the two rubber components interpenetrate each other. It is therefore impossible to separate or extract the two rubber components from each other with an ordinary organic solvent such as acetone, toluene or the like. The two rubber components constituting the composite rubber of the component (f) are a polyorganosiloxane rubber component and a polyalkyl (meth)acrylate rubber component.

The resin composition of the present invention can give a molded article of excellent impact strength, by comprising the composite rubber of the component (f). However, when the polyorganosiloxane rubber component and the polyalkyl (meth)acrylate rubber component, both constituting the composite rubber, are used singly or as a mere mixture, the resulting resin composition can not give a molded article of high impact strength. Hence, the present resin composition is thought to give a molded article of excellent impact strength because the composite rubber of the component (f) has a structure in which the crosslinked networks of the above-mentioned two rubber components interpenetrate each other.

The composite rubber as the component (f) of the present invention is preferably a composite rubber having (1) a structure in which 10 to 90% by weight of the polyorganosiloxane rubber component and 90 to 10% by weight of the polyalkyl (meth)acrylate rubber component interpenetrate each other and are substantially inseparable from each other, and (2) an average particle diameter of 0.08 to 0.6 μm. The component (f) of the present invention is especially preferably a composite rubber graft copolymer obtained by graft-polymerizing the above-mentioned composite rubber with at least one vinyl monomer.

In the composite rubber as the component (f) of the present invention, the proportions of the two rubber components are each preferably 20 to 80% by weight. The average particle diameter of the composite rubber is desirably 0.08 to 0.6 μm.

Next, description is made on the preparation of the composite rubber [the component (f)]. In the production of the composite rubber having an average particle diameter mentioned above, emulsion polymerization is most suitable. Preferably, a latex of a polyorganosiloxane rubber is prepared, the rubber particles in the latex are impregnated with a monomer for polyalkyl (meth)acrylate rubber, and the monomer is then polymerized.

The polyorganosiloxane rubber can be prepared by subjecting an organosiloxane and a crosslinking agent to emulsion polymerization. In this case, a graft-crossing agent can also be used together.

The organosiloxane includes a variety of cyclic compounds of at least three members. There are preferably used three- to six-membered cyclic compounds such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetracyclosiloxane and the like. These compounds can be used singly or in admixture of two or more. The amount of these compounds used is 50% by weight or more, preferably 70% by weight or more in the polyorganosiloxane rubber component.

As the crosslinking agent, there are used trifunctional or tetrafunctional silane type crosslinking agents such as trimethoxymethylsilane, triethoxyphenylsilane, tetramethoxysilane, tetraethoxysilane, tetra-n-propoxysilane, tetrabutoxysilane and the like. Tetrafunctional cross-linking agents are preferable with tetraethoxysilane being particularly preferable. The amount of the crosslinking agent used is 0.1–30% by weight in the polyorganosiloxane rubber component.

As the graft-crossing agent, (meth)acryloyloxysiloxane is suitable with methacryloyloxysiloxane being particularly preferable. Specific examples of the methacryloyloxysiloxane are β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane and δ-methacryloyloxybutyldiethoxymethylsilane. The amount of the graft-crossing agent used is 0 to 10% by weight in the polyorganosiloxane rubber component.

The latex of the polyorganosiloxane rubber is produced preferably, for example, by subjecting a mixture solution of an organosiloxane, a crosslinking agent and, as necessary, a graft-crossing agent to mixing with water under shear by the use of, for example, a homogenizer, in the presence of a sulfonic acid type emulsifier such as alkylbenzenesulfonic acid, alkylsulfonic acid or the like. The alkylbenzenesulfonic acid is preferred because it acts as an emulsifier for the organosiloxane and also as a polymerization initiator. In this case, it is preferred that alkylbenzenesulfonic acid metal salt, alkylsulfonic acid metal salt or the like is used therewith because it can stabilize the polymer in the graft polymerization.

The polyalkyl (meth)acrylate rubber component constituting the composite rubber can be synthesized using an alkyl (meth)acrylate, a crosslinking agent and a graft-crossing agent, described below.

The alkyl (meth)acrylate includes, for example, alkyl acrylates such as methyl acrylate, ethyl acrylate, n-propyl acrylate, n-butyl acrylate, 2-ethylhexyl acrylate and the like; and alkyl methacrylates such as hexyl methacrylate, 2-ethylhexyl methacrylate, n-lauryl methacrylate and the like. Use of n-butyl acrylate is particularly preferable.

The crosslinking agent includes, for example, ethylene glycol dimethacrylate, propylene glycol dimethacrylate, 1,3-butylene glycol dimethacrylate and 1,4-butylene glycol dimethacrylate.

The graft-crossing agent includes, for example, allyl methacrylate, triallyl cyanurate and triallyl isocyanurate. Allyl methacrylate can be used also as a crosslinking agent.

These crosslinking agents or graft-crossing agents can be used singly or in combination of two or more. The amount of the crosslinking agents or graft-crossing agents used is 0.1 to 20% by weight in the polyalkyl (meth)acrylate rubber component.

The production of the polyalkyl (meth)acrylate rubber component is conducted by adding the above-mentioned alkyl (meth)acrylate, crosslinking agent and graft-crossing agent to the latex of the polyorganosiloxane rubber component, neutralized with an aqueous solution of an alkali such as sodium hydroxide, potassium hydroxide, sodium carbonate or the like, to impregnate the polyorganosiloxane rubber particles in the latex with the alkyl (meth)acrylate, crosslinking agent and graft-crossing agent and then polymerizing the alkyl (meth)acrylate while an ordinary radical polymerization initiator is allowed to act. With the progress of the polymerization, a structure is formed in which the crosslinked network of the polyorganosiloxane rubber and the crosslinked network of the polyalkyl (meth)acrylate rubber interpenetrate, whereby there is obtained a latex of a composite rubber between polyorganosiloxane component and polyalkyl (meth)acrylate component, having a structure in which the two components are substantially inseparable.

The composite rubber has a gel content of 80% by weight or more when measured after extraction with toluene at 90° C. for 12 hours.

The vinyl monomer which can be graft-polymerized onto the composite rubber includes aromatic alkenyl compounds such as styrene, α-methylstyrene, vinyltoluene and the like; methacrylic acid esters such as methyl methacrylate, 2-ethylhexyl methacrylate and the like; acrylic acid esters such as methyl acrylate, ethyl acrylate, butyl acrylate and the like; vinyl cyanide compounds such as acrylonitrile, methacrylonitrile and the like; and so forth. These compounds can be used singly or in combination of two or more.

With respect to the proportions of the composite rubber and the vinyl monomer, the composite rubber is used in an amount of 30 to 95% by weight, preferably 40 to 90% by weight, and the vinyl monomer is used in an amount of 5 to 70% by weight, preferably 10 to 60% by weight, all based on the weight of the resulting graft copolymer.

The graft copolymer of composite rubber, as the component (f), is commercially available easily under the trade name of Metablen S-2001 (a product of Mitsubishi Rayon Co., Ltd.) and can be used preferably.

Then, description is made on the proportions of the individual components of the present resin composition.

The proportions of the components (a), (b), (c) and (d) in the resin composition are each expressed based on the total weight (100% by weight) of the components (a), (b), (c) and (d). The proportion of the component (a) is 45 to 90% by weight, preferably 55 to 80% by weight, based on the total weight (100% by weight) of the components (a), (b), (c) and (d). When the proportion of the component (a) is less than 45% by weight, the resulting composition gives a molded article of low mechanical properties and thermal properties. When the proportion is more than 90% by weight, the resulting resin composition tends to have inferior moldability.

The proportion of the component (b) is 10 to 40% by weight, preferably 15 to 35% by weight, based on the total weight (100% by weight) of the components (a), (b), (c) and (d). When the proportion of the component (b) is less than 10% by weight, the resulting composition has low moldability. When the proportion is more than 40% by weight, the resulting composition gives a molded article of low impact strength and insufficient flame retardancy.

The proportion of the component (c) is 3 to 124 by weight, preferably 5 to 10% by weight, based on the total weight (100% by weight) of the components (a), (b), (c) and (d). When the proportion of the component (c) is less than 3% by weight, the resulting composition gives a molded article of insufficient flame retardancy. When the proportion is more than 12% by weight, the resulting composition gives a molded article of low heat resistance (heat distortion temperature).

The proportion of the component (d) is 0.1 to 2% by weight, preferably 0.1 to 1.5% by weight, based on the total weight (100% by weight) of the components (a), (b), (c) and (d). When the proportion of the component (d) is less than 0.1% by weight, the resulting composition gives a molded article which causes melt-dropping during burning. When the proportion is more than 2% by weight, the resulting composition tends to give a molded article of inferior appearance.

In the resin composition of the present invention, the proportions of the components (e) and (f) are each expressed relative to the total weight (100 parts by weight) of the components (a), (b), (c) and (d). The proportion of the component (e) is 5 to 25 parts by weight, preferably 7 to 20 parts by weight, per the total weight (100 parts by weight) of the components (a), (b), (c) and (d). When the proportion of the component (e) is less than 5 parts by weight, the resulting composition gives a molded article of insufficient stiffness. When the proportion is more than 25 parts by weight, the resulting composition gives a molded article of low mechanical strengths.

The proportion of the component (f) is 1 to 13 parts by weight, preferably 1 to 10 parts by weight, per the total weight (100 parts by weight) of the components (a), (b), (c) and (d). When the proportion of the component (f) is less than 1 part by weight, the resulting composition gives a molded article of insufficient impact strength. When the proportion is more than 13 parts by weight, the resulting composition gives a molded article of low heat resistance and slightly low stiffness.

The resin composition of the present invention may comprise a small amount of other polymer as long as the objects of the present invention are not impaired thereby. Such a polymer includes a vinyl polymer, for example. The vinyl polymer can be a polymer obtained by using at least one vinyl monomer mentioned with respect to the graft copolymer as the component (f).

The resin composition of the present invention can be produced by mixing the above-mentioned individual components by a per se known method, that is, by the use of a mixer such as a tumbler, a V-shaped blender, a Nauta mixer, a Banbury mixer, a kneading roll, an extruder or the like. The present resin composition may contain other resin (e.g. polyester, polyamide and polyphenylene ether) as long as the objects of the present invention are not impaired thereby. The resin composition of the present invention may also contain, as necessary, various additives such as a stabilizer, a mold release agent, a ultraviolet absorber, a dye, a pigment and the like, in such amounts that their effects are exhibited. Particularly preferable as the stabilizer are, for example, heat stabilizers such as phosphorous acid ester, phosphoric acid ester and the like. The thus obtained resin composition is easy to mold by extrusion, injection molding, compression molding, etc. and is also applicable to blow molding, vacuum molding, etc. The present resin composition is most suitable particularly as a material for electronic and electric parts, housings for office automation apparatuses, etc., all of which require the flame retardancy specified by UL 94 V-0.

The resin composition of the present invention is applicable to any molding method such as injection molding or the like. The composition has high fluidity and is easy to mold. The molded article made therefrom has high impact resistance, excellent appearance, flame retardancy and stiffness, and is therefore most suitable as a housing for apparatuses for office automation and electric appliances for household use, which apparatuses and appliances are increasingly becoming lighter, thinner and smaller.

The resin composition of the present invention can be utilized for various molded articles such as housings or parts of note-type personal computors, desk top-type personal computers, duplicators, word processors, portable telephone and information device terminals, etc., trays of compact disks, chassis or frames of the OA equipments.

The present invention is hereinafter described specifically with reference to Examples.

EXAMPLES 1–8 AND COMPARATIVE EXAMPLES 1–13

The components shown in Table 1 were mixed in the proportions shown in Table 1, using a V-shaped blender.

Each mixture was passed through a vented twin-screw extruder of 30 mm in diameter (TEX30XSST, a product of K. K. Nippon Seikosho), at the cylinder temperature of 240° C. to obtain pellets. The pellets were dried at 100° C. for 5 hours and then passed through an injection molder (T-150D, a product of Fanuc Ltd) at the cylinder temperature of 240° C. and the mold temperature of 60° C. to prepare test pieces. The test pieces were evaluated for the following items by the following test methods.

Impact strength: measured by ASTM D 256.
Stiffness: measured by ASTM D 790.
Heat distortion temperature: measured by ASTM D 648.
Burning property: a burning test was conducted in accordance with UL Standard 94V.
Appearance: a test piece hardly influenced by the inorganic filler component and having good appearance, upon visual inspection, was rated as ○, and a test piece having poor appearance owing to the influence by the inorganic filler was rated as X.
Fluidity: measured using an Archimedes type spiral flow (thickness: 2 mm) at the cylinder temperature of 240° C. at the injection pressure of 1,000 kgf/cm², wherein a fluidity exceeding 30 cm was rated as ○ and a fluidity less than 30 cm was rated as X.

Incidentally, the components shown in Table 1 refer to the following materials.

(a) PC: polycarbonate resin (L-1225, a product of Teijin Chemicals Ltd.)
(b) ABS-1: ABS resin (Santac UT-61, a product of Mitsui Toatsu Chemicals, Inc.)
  ABS-2: ABS resin (Cevian V-680, a product of Daicel Chemical Industries, Ltd.)
(c) Flame retardant-1: triphenyl phosphate (TPP, a product of Daihachi Kagaku Co., Ltd.)
  Flame retardant-2: oligomer of tetrabromobisphenol A carbonate (FG-7000, a product of Teijin Chemicals Ltd.)
(d) PTFE: polytetrafluoroethylene (F-201L, a product of Daikin Industries, Ltd.)
(e) Talc-1: (P-3, an average particle diameter=2.8 μm, a product of Nippon Talc Co., Ltd.)
  Talc-2: (P-4, an average particle diameter=2.2 μm, a product of Nippon Talc Co., Ltd.)
  CS (chopped strand): (3PE-941, a product of Nitto Boseki Co., Ltd.)
(f) Composite rubber: composite rubber of network structure wherein a polyorganosiloxane rubber component and a polyalkyl (meth)acrylate rubber component interpenetrate (S-2001, a product of Mitsubishi Rayon Co., Ltd.)
  Acrylate rubber: (EXL 2311, a product of Kureha Chemical Industry Co., Ltd.)

TABLE 1

| | | | Examples | | | | | | | |
|---|---|---|---|---|---|---|---|---|---|---|
| | | | 1 | 2 | 3 | 4 | 5 | 6 | 7 | 8 |
| Composition | (A) PC | wt % | 71.7 | 71.7 | 61.7 | 78.7 | 71.7 | 78.7 | 70.7 | 71.7 |
| | (B) ABS-1 | " | 20 | 20 | 30 | 15 | | | 20 | 20 |
| | ABS-2 | " | | | | | 20 | 15 | | |
| | (C) Flame retardant-1 | " | 8 | 8 | 8 | 6 | 8 | 6 | 9 | 8 |
| | Flame retardant-2 | " | | | | | | | | |
| | (D) PTFE | " | 0.3 | 0.3 | 0.3 | 0.3 | 0.3 | 0.3 | 0.3 | 0.3 |
| | Total of (A) to (D) | wt. parts | 100 | 100 | 100 | 100 | 100 | 100 | 100 | 100 |
| | (E) Talc-1 | wt. parts | 20 | 8 | 15 | 15 | 15 | 15 | 15 | |
| | Talc-2 | wt. parts | | | | | | | | 8 |
| | (F) Composite rubber | wt. parts | 7 | 4 | 5 | 5 | 5 | 5 | 10 | 4 |
| | Acrylate rubber | wt. parts | | | | | | | | |
| Evaluation | Impact strength, ⅛ inch, V notched (kgfcm/cm) | | 23 | 49 | 30 | 28 | 35 | 25 | 55 | 50 |
| | Stiffness × 10³ (kgf/cm²) | | 51.5 | 32.0 | 39.5 | 41.0 | 39.5 | 40.0 | 38.0 | 31.0 |
| | Heat distortion temperature (°C.) | | 94 | 96 | 92 | 98 | 96 | 98 | 90 | 96 |
| | Burning property | | V-0 | V-0 | V-0 | V-0 | V-0 | V-0 | V-0 | V-0 |
| | Fluidity | | ○ | ○ | ○ | ○ | ○ | ○ | ○ | ○ |
| | Appearance | | ○ | ○ | ○ | ○ | ○ | ○ | ○ | ○ |

| | | | Comparative Examples | | | | | | | | |
|---|---|---|---|---|---|---|---|---|---|---|---|
| | | | 1 | 2 | 3 | 4 | 5 | 6 | 7 | 8 | 9 |
| Composition | (A) PC | wt % | 41.7 | 88.7 | 69.7 | 72.0 | 71.7 | 71.7 | 71.7 | 64.7 | 71.7 |
| | (B) ABS-1 | " | 50 | 5 | 20 | 20 | | | 20 | 20 | |
| | ABS-2 | " | | | | | 20 | 20 | | | 20 |
| | (C) Flame retardant-1 | " | 8 | 6 | | 8 | 8 | 8 | 2 | 15 | 8 |
| | Flame retardant-2 | " | | | 10 | | | | | | |
| | (D) PTFE | " | 0.3 | 0.3 | 0.3 | | 0.3 | 0.3 | 0.3 | 0.3 | 0.3 |
| | Total of (A) to (D) | wt. parts | 100 | 100 | 100 | 100 | 100 | 100 | 100 | 100 | 100 |
| | (E) Talc-1 | wt. parts | 15 | 15 | 15 | 15 | 30 | | 15 | 15 | 15 |
| | CS | wt. parts | | | | | | | 10 | | |
| | (F) Composite rubber | wt. parts | 5 | 5 | 5 | 5 | 5 | 5 | 5 | 5 | |

TABLE 1-continued

|  |  |  | wt. parts |  |  |  |  |  |  |  |  |  |
|---|---|---|---|---|---|---|---|---|---|---|---|---|
|  | Acrylate rubber |  |  | 15 | 25 | 11 | 40 | 5 | 7 | 45 | 20 | 4 |
| Evaluation | Impact strength, 1/8 inch, V notched (kgfcm/cm) |  |  |  |  |  |  |  |  |  |  |  |
|  | Stiffness × 10³ (kgf/cm²) |  |  | 40.5 | 39.0 | 35.5 | 40.5 | 58.0 | 41.5 | 37.0 | 42.5 | 43.0 |
|  | Heat distortion temperature (°C.) |  |  | 82 | 102 | 96 | 95 | 98 | 100 | 110 | 77 | 97 |
|  | Burning property |  |  | V-2 | V-0 | V-0 | V-2 | V-0 | V-0 | HB | V-0 | V-0 |
|  | Fluidity |  |  | ○ | ○ | X | X | ○ | ○ | X | ○ | ○ |
|  | Appearance |  |  | ○ | ○ | ○ | ○ | ○ | X | ○ | ○ | ○ |

|  |  |  |  | Comparative Examples |  |  |  |
|---|---|---|---|---|---|---|---|
|  |  |  |  | 10 | 11 | 12 | 13 |
| Composition | (A) PC | | wt % | 71.7 | 71.7 | 71.7 | 71.7 |
|  | (B) ABS-1 | | " |  |  | 20 | 20 |
|  |  | ABS-2 | " | 20 | 20 |  |  |
|  | (C) Flame retardant-1 | | " | 8 | 8 | 8 | 8 |
|  |  | Flame retardant-2 | " |  |  |  |  |
|  | (D) PTFE | | " | 0.3 | 0.3 | 0.3 | 0.3 |
|  | Total of (A) to (D) | | wt. parts | 100 | 100 | 100 | 100 |
|  | (E) Talc-1 | | wt. parts | 15 |  | 15 |  |
|  |  | CS | wt. parts |  |  |  | 10 |
|  | (F) Composite rubber | | wt. parts | 15 | 5 |  |  |
|  |  | Acrylate rubber | wt. parts |  |  | 5 |  |
| Evaluation | Impact strength, 1/8 inch, V notched (kgfcm/cm) | |  | 50 | 63 | 13 | 4 |
|  | Stiffness × 10³ (kgf/cm²) | |  | 35.5 | 25.0 | 39.5 | 42.0 |
|  | Heat distortion temperature (°C.) | |  | 82 | 97 | 94 | 100 |
|  | Burning property | |  | V-1 | V-0 | V-1 | V-0 |
|  | Fluidity | |  | ○ | ○ | ○ | ○ |
|  | Appearance | |  | ○ | ○ | ○ | X |

I claim:

1. A resin composition consisting essentially of:
   (a) an aromatic polycarbonate resin,
   (b) a thermoplastic graft copolymer obtained by grafting a diene rubber component with a vinyl cyanide compound and an aromatic vinyl compound,
   (c) a phosphoric acid ester,
   (d) a polytetrafluoroethylene,
   (e) a talc having an average particle diameter of 1.2 to 3.5 μm, and
   (f) a composite rubber having a network structure in which a polyorganosiloxane rubber component and a polyalkyl (meth)acrylate rubber component interpenetrate, said composite rubber having a gel content of 80% by weight or more when measured after extraction with toluene at 90° C. for 12 hours, in which composition (i) the proportions of the component (a), the component (b), the component (c) and the component (d) are 45 to 90% by weight, 10 to 40% by weight, 3 to 12% by weight and 0.1 to 2% by weight, respectively, based on the total weight (100% by weight) of the components (a), (b), (c) and (d) and (ii) the proportions of the component (e) and the component (f) are 5 to 25 parts by weight and 1 to 13 parts by weight, respectively, per the total weight (100 parts by weight) of the components (a), (b), (c) and (d).

2. The resin composition set forth in claim 1, wherein the proportion of the component (a) is 55 to 80% by weight based on the total weight (100% by weight) of the components (a), (b), (c) and (d).

3. The resin composition set forth in claim 1, wherein the proportion of the component (b) is 15 to 35% by weight based on the total weight (100% by weight) of the components (a), (b), (c) and (d).

4. The resin composition set forth in claim 1, wherein the proportion of the component (c) is 5 to 10% by weight based on the total weight (100% by weight) of the components (a), (b), (c) and (d).

5. The resin composition set forth in claim 1, wherein the proportion of the component (d) is 0.1 to 1.5% by weight based on the total weight (100% by weight) of the components (a), (b), (c) and (d).

6. The resin composition set forth in claim 1, wherein the proportion of the component (e) is 7 to 20 parts by weight per the total weight (100 parts by weight) of the components (a), (b), (c) and (d).

7. The resin composition set forth in claim 1, wherein the proportion of the component (f) is 1 to 10 parts by weight per the total weight (100 parts by weight) of the components (a), (b), (c) and (d).

8. The resin composition set forth in claim 1, wherein the component (f) is a composite rubber graft copolymer obtained by graft-polymerizing said composite rubber with at least one vinyl monomer.

9. A molded article obtained by molding the resin composition set forth in claim 1.

10. A housing obtained by molding the resin composition set forth in claim 1.

\* \* \* \* \*